United States Patent [19]

Tu

[11] Patent Number: 4,860,930
[45] Date of Patent: Aug. 29, 1989

[54] QUANTITATIVE FEEDING DEVICE

[76] Inventor: Ming L. Tu, 10-2, 104 Alley, Cheng I Street, Taichung, Taiwan

[21] Appl. No.: 213,178

[22] Filed: Jun. 29, 1988

[30] Foreign Application Priority Data

May 26, 1988 [TW] Taiwan .............................. 77204957

[51] Int. Cl.⁴ ............................................. G01F 11/10
[52] U.S. Cl. .................................... 222/231; 222/247; 222/363; 222/517
[58] Field of Search ................ 222/181, 185, 231–234, 222/243, 245, 247, 362, 363, 366, 368, 444, 516, 517

[56] References Cited

U.S. PATENT DOCUMENTS

| | | | |
|---|---|---|---|
| 30,516 | 10/1860 | Ballantine | 222/231 |
| 531,599 | 12/1894 | Ross et al. | 222/245 |
| 934,182 | 9/1909 | Jopling | 222/363 X |
| 1,438,595 | 12/1922 | Hale | 222/368 X |
| 1,710,233 | 4/1929 | Mason et al. | 222/363 X |
| 2,104,332 | 1/1938 | Rohde et al. | 222/363 |
| 2,123,318 | 7/1938 | Taylor | 222/231 U X |
| 2,154,283 | 4/1939 | Reisdorf | 222/231 X |
| 4,266,695 | 5/1981 | Ruperez | 222/185 |

FOREIGN PATENT DOCUMENTS

| | | | |
|---|---|---|---|
| 18031 | 6/1935 | Australia | 222/363 |
| 183379 | 3/1936 | Switzerland | 222/363 |
| 1052698 | 12/1966 | United Kingdom | 222/363 |

Primary Examiner—Kevin P. Shaver
Attorney, Agent, or Firm—Fleit, Jacobson, Cohn, Price, Holman & Stern

[57] ABSTRACT

A quantitative feeding device includes a housing being funnel-shaped, a hollow ball valve capable of sealingly seating in the housing and vertically rotating with respect to the housing between a first and a second positions. The ball valve has an open top and a radial protrusion defining the first position at which the open top upwardly faces when the protrusion contacts with a side wall of the housing and defining the second position at which the open top downwardly faces when the protrusion contacts with an opposite side wall of the housing. An actuating medium for rotating the ball valve between the first and second positions, an elastic member for usually urging the ball valve at the first position, and an oscillating element capable of contacting with the radial protrusion in the course of rotation between the first and second position in order to be oscillating.

1 Claim, 3 Drawing Sheets

PRIOR ART   PRIOR ART   PRIOR ART

QUANTITATIVE FEEDING DEVICE

BACKGROUND OF THE INVENTION

The present invention relates to a feeding device, and more particularly to a device for feeding a powdered material.

Preparing a hot coffee or a cold drink at the rest time is delightful. Nevertheless, various drinks are prepared from powdery materials which always are stored in containers which must contain therein spoons and need be opened and re-closed during preparing procedures of drinks which therefore are sometimes tedious.

In order to overcome the above shortcoming, a quantitative feeding device 12 is proposed by U.S. Pat. No. 3,272,399 and as shown in FIGS. 1-3 is mounted under a drink powder vessel 11 fixed in a drink-preparing apparatus 10. Feeding device 12 includes a handle 13, a powder stimulating member 14, a spring 15, a valve member 16, a tubular portion 17 and an elliptical plate 19. By controlling elliptical plate 18 to be whether contacting with the inner wall of tubular portion 17 by handle 13, one can control the quantity of the powser passing through elliptical plate 18. Such device 12, however, is experienced to have the following disadvantages:

1. Since elliptical plate 18 is inclinedly contacted with the inner wall of tubular portion 17 and the contact surface therebetween always cannot be maintained in an air-tight condition, the moisture contained in the air can easily pass therethrough to moisten and harden the powder in tubular portion 17. Although stimulating member 14 can crack a mass of moisten powder thereabove, it acts no purpose for a mass of hardened powder between members 14 and 16.

2. If device 12 has not been used for a longer period of time, it is difficult to turn the valve member 16 or elliptical plate 18 since a mass of powder 19 is moistened and hardened thereabove, as shown in FIG. 4.

3. It is inaccurate to control the quantity of powder falling down from tubular portion 17 by the time of opening elliptical plate 18. The situation will become worse if the powder in tubular portion 17 is moistened or hardened.

4. After handle 13 is actuated, spring 15 will urge elliptical plate 18 to contact with the inner wall of tubular portion 17 to thus produce a noise, if handle 13 is released.

It is thereforeattempted by the Applicant to deal with the above shortcomings encountered by the prior art.

SUMMARY OF THE INVENTION

It is therefore an object of the present invention to provide a quantitative feeding device providing a good air-tight ability to prevent the stored powder from being moistened.

It is further an object of the present invention to provide a quantitative feeding device capable of providing a constant quantity of powdery material at a time.

It is additional an object of the present invention to provide a quantitative feeding device producing no noise in operation.

According to the present invention, a quantitative feeding device includes a housing having a tubular portion and a truncated cone portion, a hollow ball valve capable of sealingly seating on a location near a junction between the tubular and cone portions and vertically rotating with respect to and in the housing between a first and a second positions and having an open top and a generally radial protrusion defining the first position at which the open top generally upwardly faces when contacting with a side wall of the housing and defining the second position at which the open top generally downwardly faces when contacting with the opposite housing side wall, an actuating medium for rotating the ball valve between the first and second positions, and an elastic member for usually urging the ball valve at the first position.

Preferably the device further includes an oscillating element for stimulating the powder in the housing to fall downwardly.

The present invention may best be understood through the following description with reference to the accompanying drawings, in which:

DETAILED DESCRIPTION OF THE PREFERRED EMBODIMENT

Figure 1:
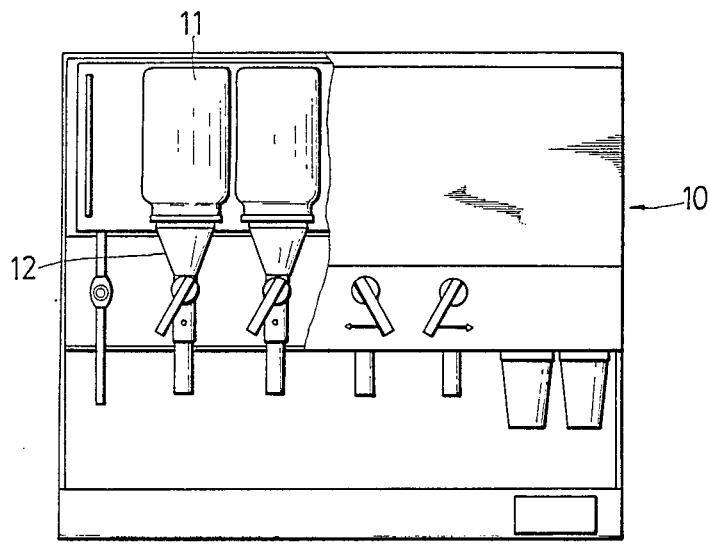
FIG. 1 is schematically front view showing a drink-preparing apparatus incorportinga prior quantitative feeding device.
Figures 2, 3, 4:
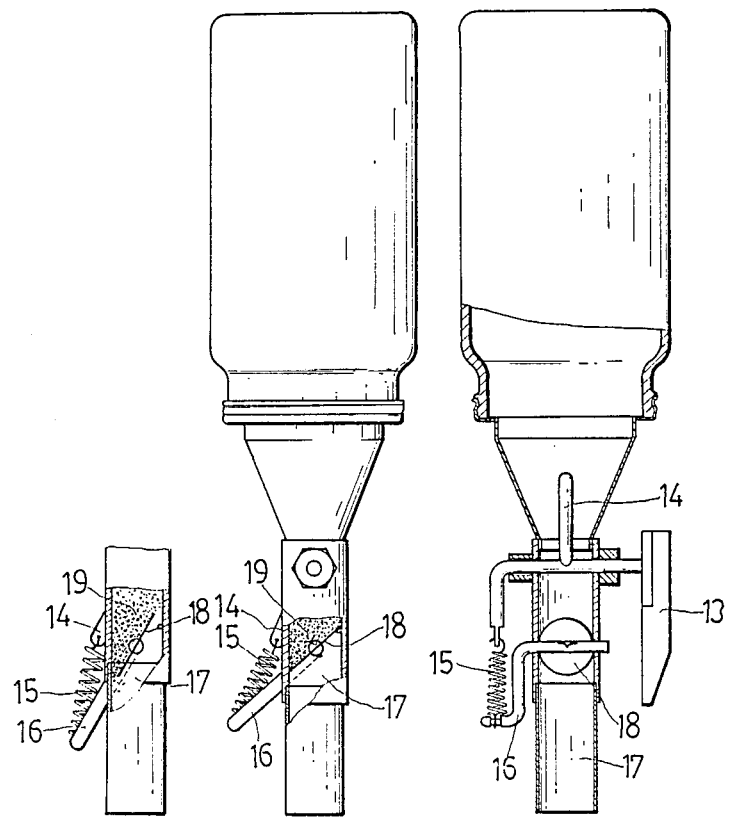
FIG. 2 is a sectional view of the quantitative feeding device in FIG. 1.
FIG. 3 is a further sectional view of the feeding device in FIG. 1.
FIG. 4 is a schematic view showing a mass of powder moistened and hardened above the elliptical plate of the feeding device in FIG. 1.
Figure 5:
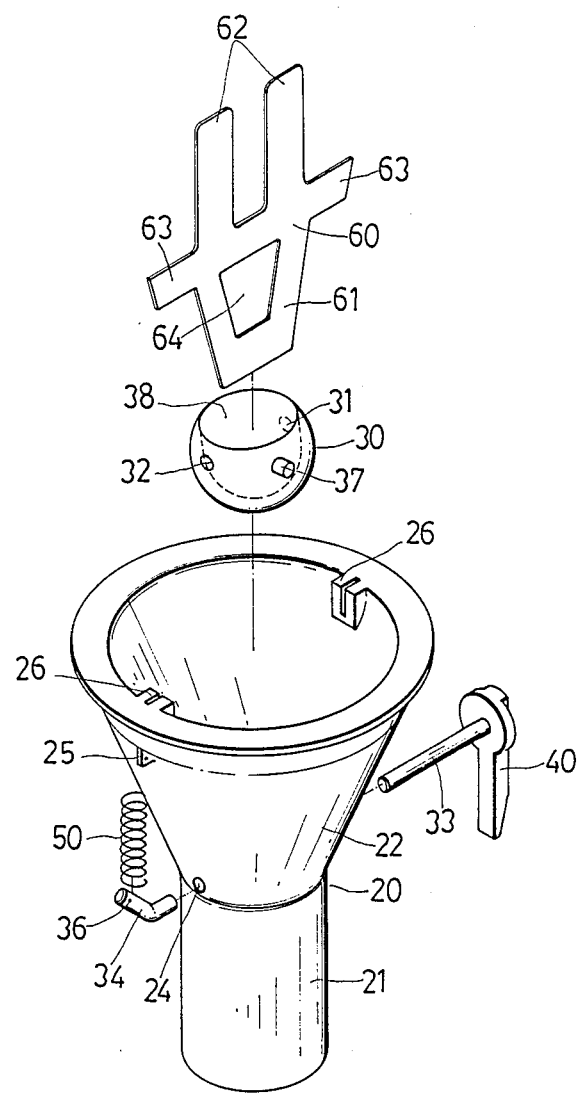
FIG. 5 is an exploded view showing a quantitative feeding device according to the present invention.

Referring now to FIGS. 5-8, the present quantitative feeding device includes a housing 20, a hollow ball valve 30, an actuating medium 40 being a handle, an elastic member 50 being a spring, and an oscillating element 60. Housing 20 includes a tubular portion 21 and a truncated cone portion 22 having two bottom opposite holes 23, 24, a top lug 25, and two top opposite seats 26, and is mounted under a vessel 70 containing a powdery material to be fed and having a suspending frame 80 to be secured to or adjacent a drink-preparing apparatus not shown.

Figure 7:
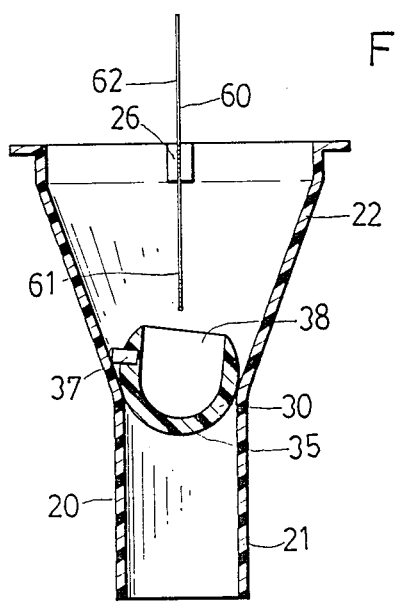
FIG. 7 is a sectional view, taken along line 7—7 in FIG. 6, showing the ball valve being at the first position.
Figure 8:
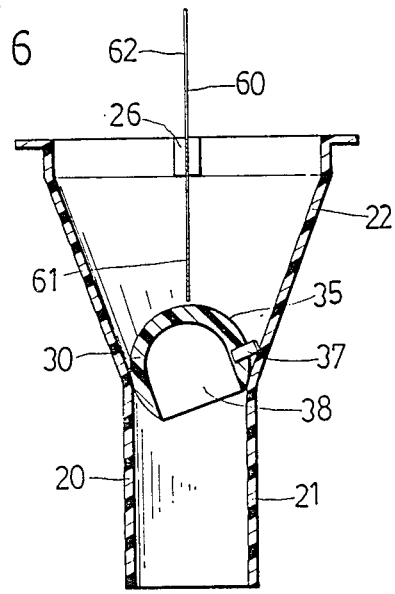
FIG. 8 is a sectional view similar to FIG. 7 but showing the ball valve being at the second position.

Ball valve 30 has a diameter at least equal to that of tubular portion 21, two opposite outer holes 31, 32 in which two aligning shafts 33, 34 respectively through holes 23, 24 are respectively engaged and fixed in order to form an annular contacting surface 35 capable of sealingly seating on a location near a junction between portions 21 and 22 and to enable that ball valve 30 is vertically rotatable with respect to and in housing 20, an open top to thus present a receiving room 38, and a radial protrusion 37 which defines a first position at which receiving room 38 upwardly faces when contacting with a side wall of housing 20 (as shown in FIG. 7) and defines a second position at which receiving room 38 downwardly faces when contacting with an opposite side wall of housing 20 (as shown in FIG. 8).

Handle 40 is fixed to shaft 33 for rotating ball valve 30 between the first and the second positions. Spring 50 is connected between lug 25 and a connecting end 36 of shaft 34 for usually urging ball valve 30 at the first position.

Figure 6:
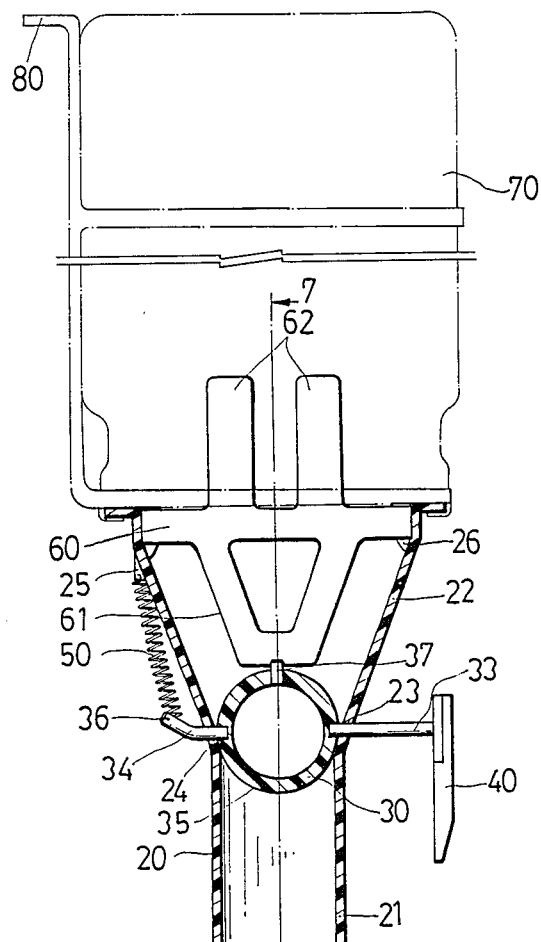
FIG. 6 is a sectional view showing an assembled feeding device in FIG. 5.

Oscillating element 60 has two arms 63 respectively inserted in seats 26, a reactive portion 61 capable of contacting with radial protrusion 37 (as shown in FIG. 6) in the course of its rotation between the first and second positions in order to oscillate oscillating element 60 to stimulate the powdery material in vessel 70 to fall downwards and having a central recess 64 in order to facilitate the oscillation of oscillating element 60 in the powdery material, and two extensions 62 extended into vessel 70 to provide the same function as reactive portion 61 does.

When receiving room 38 upwardly faces, it will be filled with the powdery material. When handle 40 is turned to have ball valve 30 located in the second position, the powdery material in receiving room 38 will fall down through tubular portion 21. When handle 40 is released, spring 50 brings ball valve 30 back to the first position to refill receiving room 38 with the powdery material.

The advantages of the present invention can be summarized as follows:

1. Since ball valve 30 is sealingly seated on housing 20, the moisture contained in the air is incapable of passing through a space therebetween to moisten and harden the powdery material in housing 20.

2. The present device will at each time constantly provide a quantity of the powdery material equal to the volume of receiving room 38 and irrelevant to the time of turning handle 40 and thus it is effectively "quantitative."

3. If the moisture invades in housing 20 by accident, moistened and hardened powdery material will first build up around the lowest portion of truncated cone portion 22. Since the rotation of ball valve 30 will not damage the gradually built moistened and hardened powdery material, a moisture shield will thus be formed to shield any moisture from passing through the hardened powdery material into housing 20. This phenomenon is similar to that an oxidized aluminum surface of an aluminous piece will protect the inner aluminum from being oxidized.

4. Spring 50 only needs to bring ball valve 30 back to the first position after handle 40 has turned it to the second position, whereas the spring 15 in the prior art must have a large elastic force in order that elliptical plate 18 can contact against the inner wall of tubular portion 17 again within a short time. Thus, no noise in the present invention will be produced.

5. Oscillating element 60 has an oscillating range covering the lower portion of vessel 70 and truncated portion 22, which will ensure a smooth falling of the powdery material in vessel 70.

6. The present device is easier than the prior art, so far as the assembling work is concerned.

Through the above description, it should not become apparent how and why the present invention can achieve the objects it contemplates.

What I claim is:

1. A quantitative feeding device, comprising:

a hollow housing having an upper truncated cone portion joined with and narrowing into a lower round tubular portion, the housing being adapted for mounting under a vessel containing a material to be fed;

a hollow ball valve having an open top and a diameter at least equal to that of the housing tubular portion, the ball valve sealingly seating within the housing proximate the junction of the cone and tubular portions thereof by an annular surface of the ball valve contacting with the housing for thereby sealing the cone portion from the tubular portion, the ball valve being sealingly rotatable in the housing, the ball valve including a radial protrusion for contactingwith respective opposite side walls of the housing for thereby limiting rotation of the ball valve within the housing between a first position at which the open top of the ball valve faces generally upwardly and a second position at which the open top of the ball valve faces generally downwardly;

a pair of aligned shafts passing through respective opposite side walls of the housing and respectively fixed in diametrically opposite sides of the ball valve;

a handle secured to one of the shafts for rotating the ball valve between said first and second positions thereof;

an elastic member mounted between the housing and the other of the shafts for urging the ball valve towards said first position thereof; and an oscillating element mounted in the truncated cone portion of the housing, the oscillating element having an upwardly extending extension portion extending above the housing cone portion for extending into a vessel mounted thereabove, and a downwardly extending reactive portion extending adjacent the ball valve in the housing cone portion for being contacted by the radial protrusion of the ball valve as the ball valve is rotated between the first and second positions thereof for oscillating the oscillating element.

* * * * *